Feb. 10, 1953 F. W. SEYBOLD 2,627,724
ROTARY, MULTIPLE TURBINE HYDRAULIC COUPLING
Filed May 20, 1950 2 SHEETS—SHEET 1

INVENTOR
FREDERICK W. SEYBOLD
By
Toulmin & Toulmin
ATTORNEY

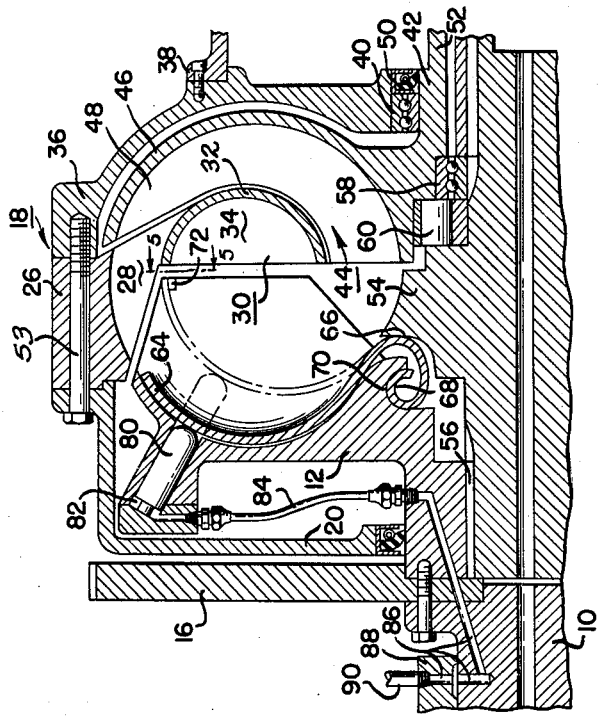
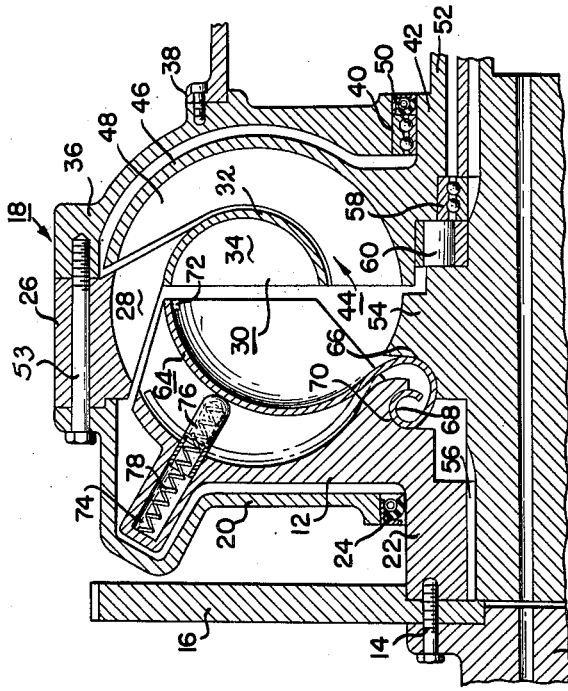

Patented Feb. 10, 1953

2,627,724

UNITED STATES PATENT OFFICE 2,627,724

ROTARY, MULTIPLE TURBINE HYDRAULIC COUPLING

Frederick W. Seybold, Westfield, N. J.

Application May 20, 1950, Serial No. 163,245

4 Claims. (Cl. 60—54)

This invention relates to fluid drive units, and particularly to fluid couplings and the like employing rotatable impellers for driving oil into runner-type reaction members.

In the usual type fluid coupling there is only a single path about which the oil of the coupling may circulate whereby the impeller and runner means of the coupling are always coupled together in a certain fashion to drive a single output member. A coupling of this nature is highly useful but, under certain circumstances as, for example, in connection with the combination of such a coupling with an automatic transmission, elaborate controls and gear arrangements are required in the transmission to obtain various drive ratios between the single output member of the coupling and the output member of the transmission. An arrangement of this type is, of course, quite expensive and is subject to wear and failure in use.

In my co-pending application, Serial No. 120,649, filed October 11, 1949, now Patent No. 2,548,272, issued April 10, 1951, I disclosed the combination of an automatic transmission with a fluid coupling having two runners, one of which was energized by the impeller at low speed and the other of which was energized at high speed. The coupling of that application, and which is also disclosed in my co-pending application Serial No. 161,682, filed May 12, 1950, was characterized in that it had two output members, each having its own runner, and the impeller of the coupling included an auxiliary, resilient, inner shell member that yielded at a predetermined speed of operation of the impeller due to the centrifugal force of the oil being pumped by the impeller. The resilient shell shown in the two applications referred to was a one-piece member formed from relatively thin metal and attached to the impeller as a single unit. While this arrangement has proved to be satisfactory in all respects as far as the operation of the coupling is concerned, it nevertheless imposes certain limitations on the operation of the coupling and also presents certain problems of manufacture. For example, with a one-piece inner shell of the type described in those applications, large and expensive forming dies are required and the material is necessarily brought to the forming dies in the form of broad strips or large sheets. It is also essential that the material be of uniform quality or else one part of the shell will have different characteristics than another part.

It is also essential with a one-piece shell of this nature to hold the impeller to very close limits during its manufacture so the die formed shell will fit with the proper degree of closeness.

Having the foregoing in mind, it is a primary object of this invention to provide a fluid coupling of the single impeller-multiple runner type including an improved means for selectively coupling the impeller with the runners.

Another object is to provide an impeller for a fluid coupling and a plurality of runners with a novel arrangement associated with the impeller for selectively coupling it with the runners.

A still further object is the provision of a coupling having an impeller with movable elements thereon for selectively coupling it with multiple runners in the coupling such that the elements can readily be manufactured and readily assembled with the impeller.

A still further object is the provision of a fluid coupling having an impeller and a plurality of runners in which the coupling of the impeller with the runners can selectively be controlled.

These and other objects and advantages will become more apparent upon reference to the following description taken in connection with the accompanying drawings in which:

Figure 3 is a view like Figure 1 but shows how the fingers between the partitions of the impeller can be controlled by an auxiliary spring.

Figure 4 is a view like Figure 3 but shows a fluid pressure control arrangement for the fingers.

Figure 1:
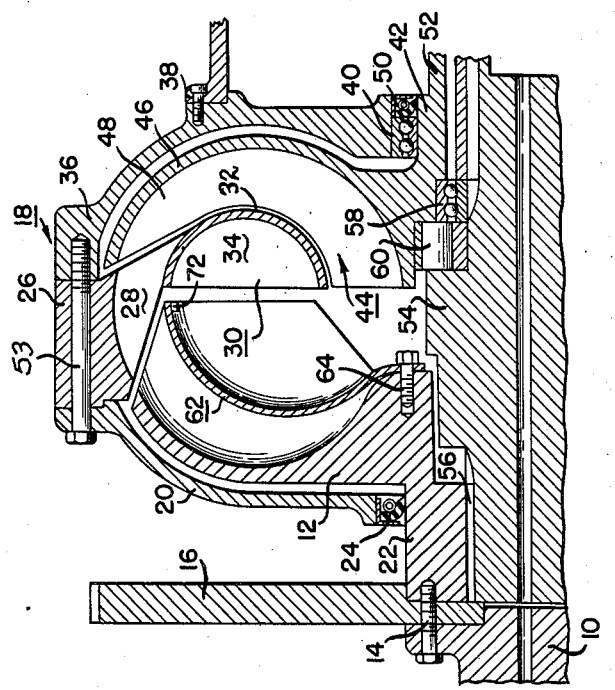
Figure 1 is a fragmentary view of a fluid coupling showing one form of my invention.

Referring to the drawings somewhat more in detail, the fluid coupling illustrated in Figure 1 comprises an input shaft 10 which is secured to the impeller 12 of the coupling as by the cap screws 14 which may also serve to clamp starter gear 16 into position.

The fluid coupling also comprises a multiple part casing 18 having a first part 20 shrouding the impeller 12 and fitting relatively closely about the hub 22 thereof. An oil seal 24 is carried by casing part 20 to prevent leakage of oil from the coupling.

A second part of the casing is indicated at 26 and includes the spaced radially inwardly extending ribs 28 which carry the semi-toroidal runner 30 having an outer enclosing shell 32 and the partitions 34 therein.

Casing 18 comprises a third part 36 which may be connected with a member 38 forming one of the output elements of the transmission. Part 36 is preferably journaled as by anti-friction bearings 40 on hub 42 of a second runner 44 that is concentric with runner 30. Runner 44 comprises outer shell 46 which is shrouded by casing part 36 and has partitions 48. Runner 44 has its hub sealed as by oil seal 50 in casing part 36 to prevent leakage of oil from the coupling. The hub is also extended as indicated at 52 and forms a second output element for the coupling.

The three parts of the casing, 20, 26, 36, may advantageously be secured together by cap screws 53 in the manner illustrated. Other elements of the coupling may comprise shaft 54 connected with impeller 12 by splines 56 and journaled within the runner 44 by bearing 58. Overrunning clutch 60 may be positioned between runner 44 and shaft 54 for the purpose of permitting relative movement between the runner and shaft in one direction and for locking them against relative movement in the other direction.

According to this invention, a plurality of resilient finger elements 62 are provided which are secured at their inner ends to the hub part of the impeller by cap screws 64 and which have their outer ends positioned so as to face and be closely adjacent to the outer peripheral edge of shell 32 of runner 30. It will be evident at this point that whenever impeller 12 is running at low speed the spring fingers 62, and of which there are as many on the impeller as there are partitions, will occupy their Figure 1 position and deflect substantially all of the oil pumped by the impeller into the runner 30. However, when the speed of the impeller reaches a predetermined value, there is a substantial centrifugal force exerted by the pumped oil on the resilient fingers and this will cause the said fingers to yield outwardly, thereby to admit the pumped oil between ribs 28 into runner 44.

It will be evident that the resilient fingers provide means whereby the impeller of the coupling is coupled with one runner below a predetermined speed, and with the other runner above a predetermined speed. By connecting suitable gearing arrangements between output elements of the coupling and a driven device, the coupling will act automatically to change the speed ratio of the drive assembly at a predetermined speed. It will also be evident that this is accomplished very smoothly and without the jerking and shocks that usually accompany the effecting of such speed changes by clutches and brakes as in the usual type transmission having a conventional fluid coupling or torque connector.

Figure 2:
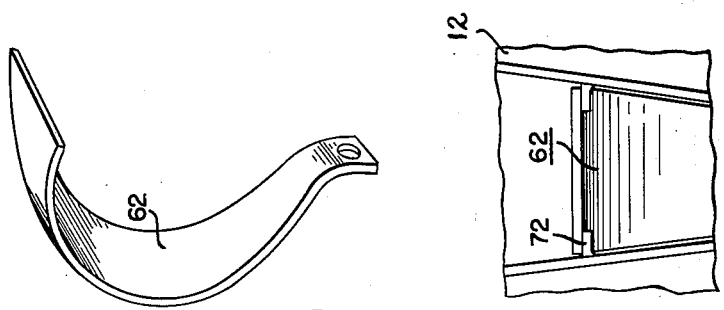
Figure 2 is a perspective view of a resilient finger of the type which is mounted between the partitions of the impeller of Figure 1.
Figure 5:
Figure 5 is a view indicated by line 5—5 on Figure 4 showing a stop arrangement carried by the partitions for predetermining the innermost position of the movable fingers.

On reference to Figure 2 it will be observed that the resilient fingers 62 are relatively small and of quite simple configuration and that they therefore can be made from narrow strip stock with a relatively simple and fairly small punch and die set. Both of these characteristics represent an advantage over the large one-piece shell referred to previously. The individual fingers are also easy to assemble with the impeller and may be modified to meet varying conditions in a fairly economical manner.

Turning now to Figure 3, substantially the same sort of arrangement is illustrated and the same reference numerals are employed wherever applicable. In Figure 3, however, the finger elements 64 are not necessarily of resilient or yieldable material and may be made stiff. They are formed at their lower ends with a turned back part having an arcuate nose as at 66 and cylindrical trailing part as at 68. Part 68 is receivable in a correspondingly shaped groove 70 extending about the inner periphery impeller 12 so the part and groove form a pivot for the finger. Nose part 66 may serve as a stop to assist in locating the fingers in their innermost position, as well as representing a configuration which can easily be arrived at in forming the fingers and which is free of excessive stresses during operation of the coupling.

Additional stop means may be provided in the form of projections 72 on the partitions of the impeller which engage the fingers in their innermost position and support them in proper relation with runner 30.

The outer shell of the impeller in Figure 3 is formed with a plurality of cylindrical pockets 74 in which are reciprocably mounted hollow, round nosed plungers 76 that are urged into engagement with the back surfaces of fingers 64 by the springs 78. It will be evident that the arrangement of Figure 3 will operate in substantially the same manner as the arrangement of Figure 1 in that, at a predetermined speed of operation of impeller 12, the fingers will move outwardly and permit pumped oil to enter the outer runner 44.

Turning now to Figure 4, a still further modification is illustrated which is quite similar to the arrangement of Figure 3 and wherein the same reference numerals are employed where applicable. In Figure 4 instead of the fingers 64 being urged toward their inner position by spring loaded plungers, there is employed fluid operable plungers 80 which reciprocate in cylinders 82 adapted for being supplied with pressure fluid by an oil passage comprising conduit 84 and bores 86 leading to a suitable stationary supply collar 88 to which is connected the supply conduit 90. By the arrangement of Figure 4, a predetermined oil pressure can be supplied to cylinders 82 and the fingers 64 will move outwardly whenever the force thereon, due to the circulating oil, overcomes the fluid pressure on the pistons 80. The Figure 4 arrangement, however, also permits selective external control of the position of the fingers by a suitable valving arrangement associated with the fluid supply to the cylinders 82. This valving arrangement could be automatically controlled or manually controlled as desired. An incidental advantage to the Figure 4 arrangement is that there would be little or no difference between the forces at which the separate fingers 64 would move outwardly. Thus, where the resilience of the spring fingers 62 in Figure 1 might vary somewhat and introduce a slight variation in the exact instants the fingers moved outwardly, and whereas the springs 78 in Figure 3 might also vary somewhat, the fingers in the Figure 4 arrangement would all move out at the same time.

It is also to be noted that the rate at which the fingers in the Figure 4 arrangement move outwardly could readily be controlled by any suitable throttling arrangement for controlling the rate of discharge of fluid from the cylinders 82. In this manner the shifting over of the impeller from driving the inner runner to driving the outer runner could be made very smoothly.

It will be understood that this invention is susceptible to modification in order to adapt it to different usages and conditions; and, accordingly, it is desired to comprehend such modifications within this invention as may fall within the scope of the appended claims.

I claim:

1. In a fluid coupling; a rotatable impeller having partitions, a pair of concentric runners rotatable relative to each other and to said impeller, said runners having radial partitions, individual curved finger elements mounted on the hub of the impeller and extending outwardly between the partitions of said impeller and serving to deflect the fluid pumped by the impeller into the inner one of said runners, means pivotally supporting the finger elements on the impeller adjacent the hub thereof, second means on the impeller urging said finger elements in their said inner positions, said second means urging said finger elements inwardly and yielding to permit movement of the said finger elements outwardly whereby the impeller may be coupled with the outer of said runners, at least the inner of said runners having a shell substantially semicircular in cross section, the outer edge of which is closely adjacent the inner position of the outer ends of the finger elements whereby the fluid pumped by the impeller when the finger elements are in their inner positions passes directly into the said shell.

2. In a fluid coupling; a rotatable impeller having partitions, a pair of concentric runners positioned to be energized by fluid pumped by said impeller and being relatively rotatable and also being rotatable relative to said impeller, said runners having substantially semi-circular shells and partitions, a plurality of individual curved finger elements pivotally mounted on the hub of the impeller and extending outwardly between the partitions of the impeller and having an inner position where the outer ends of the finger elements are closely adjacent the outer edge of the shell of the inner runner whereby the fluid pumped by the impeller is directed to only the inner of said runners, said finger elements also having an outer position where the fluid pumped by the impeller will enter the outer of said runners, means limiting the movement of said finger elements in both directions, and spring means carried by the impeller and urging said finger elements toward their inner positions.

3. In a fluid coupling; a rotatable impeller having partitions, a pair of concentric runners positioned to be energized by fluid pumped by said impeller and being relatively rotatable and also being rotatable relative to said impeller, said runners having nesting shells substantially semi-circular in cross-section and also having partitions, a plurality of individual curved finger elements pivotally mounted on the hub of the impeller and extending outwardly between the partitions of said impeller and having an inner position where the outer ends of the finger elements are closely adjacent the outer edge of the shell of the inner runner whereby the fluid pumped by the impeller is directed to only the inner of said runners, said finger elements also having an outer position where the fluid pumped by the impeller will enter the outer of said runners, means limiting the movement of said finger elements in both directions, and fluid operable means carried by said impeller and in contact with the said curved finger elements to move said finger elements to their inner positions when fluid pressure is applied to said fluid operable means.

4. In a fluid coupling; a rotatable impeller having partitions, a pair of concentric runners positioned to be energized by fluid pumped by said impeller and being relatively rotatable and also being rotatable relative to said impeller, said runners having shells that are substantially semicircular in cross section and also having partitions, a plurality of individual curved finger elements pivotally mounted on the hub of the impeller and extending outwardly between the partitions of said impeller and having an inner position where the ends of the finger elements are closely adjacent the outer edge of the shell of the inner runner, whereby the fluid pumped by the impeller is directed to only the inner of said runners, said finger elements also having an outer position where the fluid pumped by the impeller will enter the outer of said runners, means limiting the movement of said finger elements in both directions, a plurality of cylinders and pistons carried by said impeller, said pistons being in contact with the back surfaces of said finger elements, and means for selectively admitting pressure fluid to said cylinders to move the finger elements to their inner positions, or to exhaust said admitted fluid from said cylinders to permit movement of the finger elements to their outer positions.

FREDERICK W. SEYBOLD.

REFERENCES CITED

The following references are of record in the file of this patent:

UNITED STATES PATENTS

| Number | Name | Date |
| --- | --- | --- |
| 2,061,997 | Dunn | Nov. 24, 1936 |
| 2,074,170 | Dunn | Mar. 16, 1937 |
| 2,378,353 | Zeider | June 12, 1945 |
| 2,420,071 | Fields | May 6, 1947 |
| 2,428,134 | Zeider | Sept. 30, 1947 |
| 2,473,137 | Clifton | June 14, 1949 |
| 2,536,842 | Duffield | Jan. 2, 1951 |